US009414429B2

(12) United States Patent
Payyappilly et al.

(10) Patent No.: US 9,414,429 B2
(45) Date of Patent: Aug. 9, 2016

(54) METHOD AND APPARATUS FOR MAINTAINING AN ALWAYS-ON DATA SESSION IN A WIRELESS COMMUNICATION NETWORK

(75) Inventors: Ajith T. Payyappilly, San Diego, CA (US); Lei Shen, San Diego, CA (US); Parag Arun Agashe, San Diego, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1443 days.

(21) Appl. No.: 11/830,710

(22) Filed: Jul. 30, 2007

(65) Prior Publication Data

US 2009/0003208 A1 Jan. 1, 2009

Related U.S. Application Data (60) Provisional application No. 60/946,913, filed on Jun. 28, 2007.

(51) Int. Cl.
*H04L 29/08* (2006.01)
*H04W 76/04* (2009.01)
(Continued)

(52) U.S. Cl.
CPC ........... *H04W 76/045* (2013.01); *H04L 67/145* (2013.01); *H04L 67/147* (2013.01); *H04L 67/14* (2013.01); *H04W 4/20* (2013.01); *H04W 80/02* (2013.01)

(58) Field of Classification Search
None
See application file for complete search history.

(56) References Cited

U.S. PATENT DOCUMENTS

| 7,295,545 | B2 | 11/2007 | Ray et al. |
| 7,796,995 | B2 | 9/2010 | Gill et al. |
| 2002/0167905 | A1 * | 11/2002 | Wenzel et al. ............... 370/249 |

(Continued)

FOREIGN PATENT DOCUMENTS

| JP | 2006101348 A | 4/2006 |
| JP | 2009509392 A | 3/2009 |

(Continued)

OTHER PUBLICATIONS

International Search Report—PCT/US08/067943; International Search Authority—European Patent Office —Jan. 28, 2009.

(Continued)

*Primary Examiner* — Mohammad Adhami
(74) *Attorney, Agent, or Firm* — Michael J. DeHaemer, Jr.; Rupit Patel (57) ABSTRACT

Techniques for maintaining an always-on data session for an access terminal are described. Messages to keep alive the data session may be sent using non-traffic channels to avoid bringing up traffic channels just to send these messages. In one design, an access network may send a first message (e.g., a RouteUpdateRequest message) on a first non-traffic channel (e.g., a control channel) to the access terminal. The access terminal may return a second message (e.g., a RouteUpdate message) on a second non-traffic channel (e.g., an access channel) to the access network. The access network may then send a third message (e.g., for an Echo-Request) on the first non-traffic channel over a smaller area covering an approximate location of the access terminal, which may be determined based on the second message. The access terminal may return a fourth message (e.g., for an Echo-Reply) on the second non-traffic channel to the access network.

60 Claims, 8 Drawing Sheets

(51) Int. Cl.
*H04W 4/20* (2009.01)
*H04W 80/02* (2009.01)

(56) References Cited

U.S. PATENT DOCUMENTS

| | | | |
|---|---|---|---|
| 2002/0191554 A1* | 12/2002 | Kondo | H04W 64/00 370/328 |
| 2003/0148771 A1 | 8/2003 | De | |
| 2003/0157945 A1 | 8/2003 | Chen et al. | |
| 2004/0167978 A1 | 8/2004 | Kitayama | |
| 2004/0266450 A1* | 12/2004 | Chowdhury | 455/452.2 |
| 2005/0288041 A1* | 12/2005 | Gill et al. | 455/458 |
| 2006/0002358 A1 | 1/2006 | Ray et al. | 370/342 |
| 2006/0014551 A1* | 1/2006 | Yoon et al. | 455/458 |
| 2008/0026715 A1* | 1/2008 | Gao | 455/187.1 |

FOREIGN PATENT DOCUMENTS

| | | |
|---|---|---|
| JP | 2009509455 A | 3/2009 |
| JP | 2009515414 A | 4/2009 |
| WO | 2007035045 A2 | 3/2007 |
| WO | 2007035058 A2 | 3/2007 |
| WO | 2007069822 A2 | 6/2007 |

OTHER PUBLICATIONS

Written Opinion—PCT/US08/067943, International Search Authority—European European Patent Office—Jan. 28, 2009.
Taiwan Search Report—TW097124396—TIPO—Feb. 17, 2012.

* cited by examiner

METHOD AND APPARATUS FOR MAINTAINING AN ALWAYS-ON DATA SESSION IN A WIRELESS COMMUNICATION NETWORK

CLAIM OF PRIORITY UNDER 35 U.S.C. §119

The present Application for Patent claims priority to Provisional Application No. 60/946,913 entitled "Method and Apparatus for Maintaining an Always-On Data Session in a Wireless Communication Network" filed Jun. 28, 2007, and assigned to the assignee hereof and hereby expressly incorporated by reference herein.

BACKGROUND

I. Field

The present disclosure relates generally to communication, and more specifically to techniques for maintaining an always-on data session in a wireless communication network.

II. Background

Wireless communication networks are widely deployed to provide various services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

An access terminal may establish a data session with a wireless network in order to obtain a data service. A data session is a configuration setup that allows for exchange of data between an access terminal and a wireless network. A data session may be established in different manners for different wireless networks and may be associated with configuration information and/or assigned resources. A data service may be any service offered by a wireless network and involving exchanges of data. Some examples of data services include voice, video, general Internet connectivity, multimedia streaming and broadcast services, Short Message Service (SMS) and text messaging services, geographic position-based services, etc.

An access terminal may be active only sporadically during a data session and may exchange data with a wireless network whenever there is data to send or receive. However, it may be desirable to have the data session be always on, so that data may be exchanged quickly when available. It may also be desirable to maintain the always-on data session using as little network resources as possible.

There is therefore a need in the art for techniques to efficiently maintain an always-on data session for an access terminal in a wireless communication network.

SUMMARY

Techniques for efficiently maintaining an always-on data session for an access terminal in a wireless communication network are described herein. In an aspect, messages to keep alive the data session may be sent using non-traffic channels, which may avoid the need to set up a radio connection and bring up traffic channels just to send these messages. In one design, the access terminal may receive a first message on a first non-traffic channel (e.g., a control channel) from an access network and may send a second message on a second non-traffic channel (e.g., an access channel) to the access network. The first and second messages may be exchanged using non-traffic channels to keep alive the data session for the access terminal. For High Rate Packet Data (HRPD) in cdma2000, the data session may comprise a Point-to-Point Protocol (PPP) session, the first message may comprise a Link Control Protocol (LCP) Echo-Request packet, the second message may comprise an LCP Echo-Reply packet, and the first and second messages may be sent using Data Over Signaling (DOS) protocol. Other messages and channels may also be used for other radio technologies.

In another aspect, an approximate location of the access terminal may be ascertained prior to sending signaling to the access terminal, which may reduce the area over which to send the signaling and hence conserve radio resources. In one design, the access terminal may receive a first message (e.g., a RouteUpdateRequest message in cdma2000) on the first non-traffic channel from the access network and may send a second message (e.g., a RouteUpdate message in cdma2000) on the second non-traffic channel to the access network. The first and second messages may be exchanged to determine the approximate location of the access terminal. The access terminal may then receive a third message on the first non-traffic channel from the access network, with the third message being sent over an area covering the approximate location of the access terminal. In general, the third message may carry any information for the access terminal. If the third message contains signaling (e.g., an LCP Echo-Request packet) to keep alive the data session for the access terminal, then the access terminal may send a fourth message (e.g., for an LCP Echo-Reply packet) on the second non-traffic channel to the access network.

Various aspects and features of the disclosure are described in further detail below.

DETAILED DESCRIPTION

The techniques described herein may be used for various wireless communication networks such as CDMA, TDMA, FDMA, OFDMA, and SC-FDMA networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. These various radio technologies and standards are known in the art. UTRA, E-UTRA, and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available.

For clarity, certain aspects of the techniques are described for a High Rate Packet Data (HRPD) network that implements IS-856. HRPD is also referred to as CDMA2000 1×EV-DO, 1×EV-DO, 1×-DO, DO, High Data Rate (HDR), etc.

Figure 1:
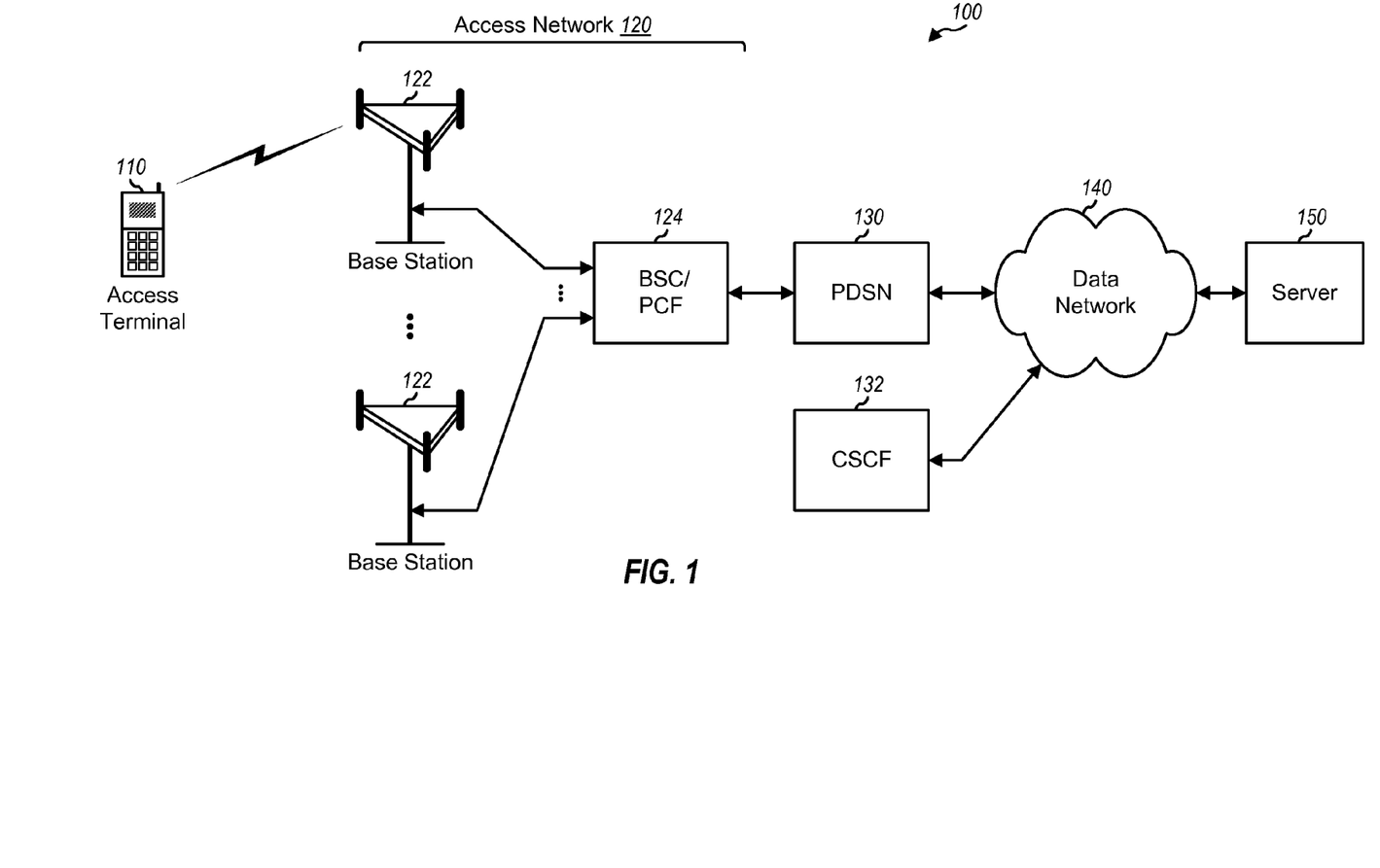
FIG. 1 shows a wireless communication network.

FIG. 1 shows a wireless communication network 100, which may be an HRPD network. Wireless network 100 includes (a) an access network 120 that supports radio communication for access terminals and (b) network entities that perform various functions to support communication services. An access network may also be referred to as a radio network, a radio access network (RAN), etc. Access network 120 may include any number of base stations 122 and any number of Base Station Controllers/Packet Control Functions (BSCs/PCFs) 124. A base station is generally a fixed station that communicates with the access terminals and may also be referred to as an access point, a base transceiver station (BTS), a Node B, an evolved Node B (eNode B), etc. Each BSC/PCF 124 couples to a set of base stations, provides coordination and control for the base stations under its control, and routes data for these base stations.

A Packet Data Serving Node (PDSN) 130 supports data services for access terminals communicating with access network 120. PDSN 130 may be responsible for establishment, maintenance, and termination of data sessions for access terminals and may further assign dynamic Internet Protocol (IP) addresses to the access terminals. PDSN 130 may communicate with other network entities to support the data services. PDSN 130 may couple to a data network 140, which may comprise the Internet, private data networks, public data networks, etc. PDSN 130 may communicate with various entities via data network 140.

A Call Session Control Function (CSCF) 132 performs various functions to support IP Multimedia Subsystem (IMS) services such as Voice-over-IP (VoIP), multimedia, instant messenger (IM), Short Message Service (SMS) over IP, push-to-talk (PTT), etc. Some of these IMS services are defined in 3GPP IMS and 3GPP2 Multimedia Domain (MMD). CSCF 132 may process requests from access terminals for IMS services, perform registration for IMS, provide session control services, maintain session state information, etc. Wireless network 100 and access network 120 may include other network entities not shown in FIG. 1.

An access terminal 110 may communicate with access network 120 to obtain various services supported by wireless network 100. Access terminal 110 may also be referred to as a mobile station, a user equipment, a terminal, a user terminal, a subscriber unit, a station, etc. Access terminal 110 may be a cellular phone, a personal digital assistant (PDA), a wireless device, a handheld device, a wireless modem, a laptop computer, etc. Access terminal 110 may communicate with one or more base stations on the forward and/or reverse links at any given moment. The forward link (or downlink) refers to the communication link from the base stations to the access terminals, and the reverse link (or uplink) refers to the communication link from the access terminals to the base stations. Access terminal 110 may communicate or exchange data with other terminals and/or other entities (e.g., a server 150) via access network 120 and PDSN 130.

Figure 2:
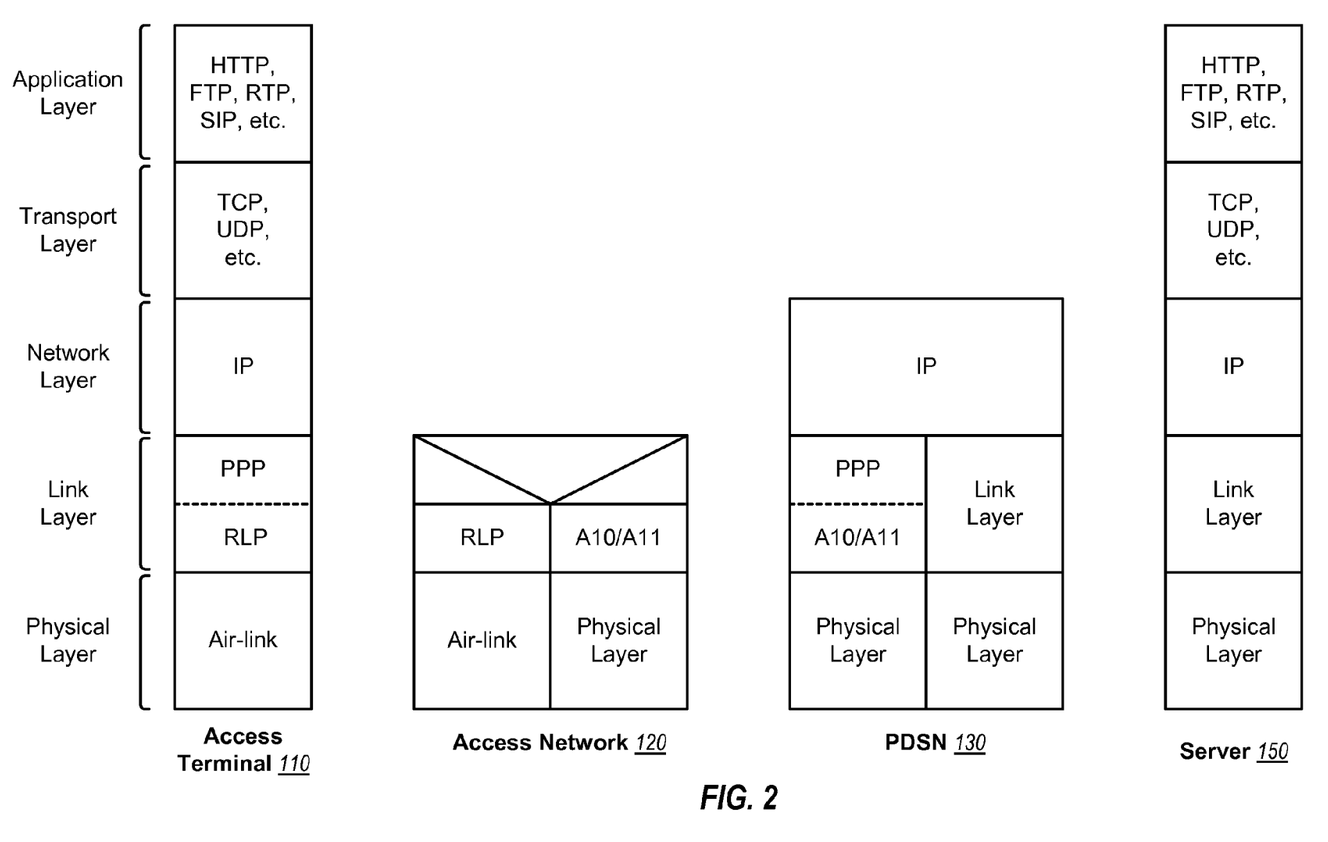
FIG. 2 shows example protocol stacks at various entities in FIG. 1.

FIG. 2 shows example protocol stacks at various entities in FIG. 1 for communication between access terminal 110 and server 150. The protocol stack for each entity may include an application layer, a transport layer, a network layer, a link layer, and a physical layer.

Access terminal 110 may communicate with server 150 using HyperText Transfer Protocol (HTTP), File Transfer Protocol (FTP), Real-time Transport Protocol (RTP), Session Initiation Protocol (SIP), and/or other protocols at the application layer. Application layer data may be sent using Transmission Control Protocol (TCP), User Datagram Protocol (UDP), and/or other protocols at the transport layer. These various protocols are known in the art. Transport layer data may be encapsulated in IP packets, which may be exchanged between access terminal 110 and server 150 via access network 120, PDSN 130, and possibly other entities.

The link layer between terminal 110 and access network 120 is typically dependent on the radio technology used by the access network. For HRPD, the link layer is implemented with Point-to-Point Protocol (PPP) over Radio Link Protocol (RLP). Access terminal 110 may maintain a PPP session with PDSN 130 and may exchange data with access network 120 via RLP. A data session may comprise a PPP session in HRPD. RLP operates on top of a radio/air-link interface, which is IS-856 for HRPD. Access network 120 may communicate with PDSN 130 via a technology-dependent interface (e.g., A10 and A11 interfaces) that operates on top of a physical layer. A10 is a data interface, and A11 is a signaling interface between PCF 124 and PDSN 130. PDSN 130 may communicate with server 150 via IP over a link layer and a physical layer.

Access terminal 110 may support IMS applications such as VoIP, instant messenger, etc. These IMS applications may be expected to be always on. Access terminal 110 may register with IMS in wireless network 100, e.g., at power up. The IMS registration may allow wireless network 100 to reach access terminal 110 for IMS services and to quickly exchange data with access terminal 110 at any time. For example, access terminal 110 may register with CSCF 132 for a VoIP application and/or an instant messenger application at all times so that wireless network 100 knows how to reach access terminal 110 for incoming VoIP calls and/or instant messages.

Figure 3:
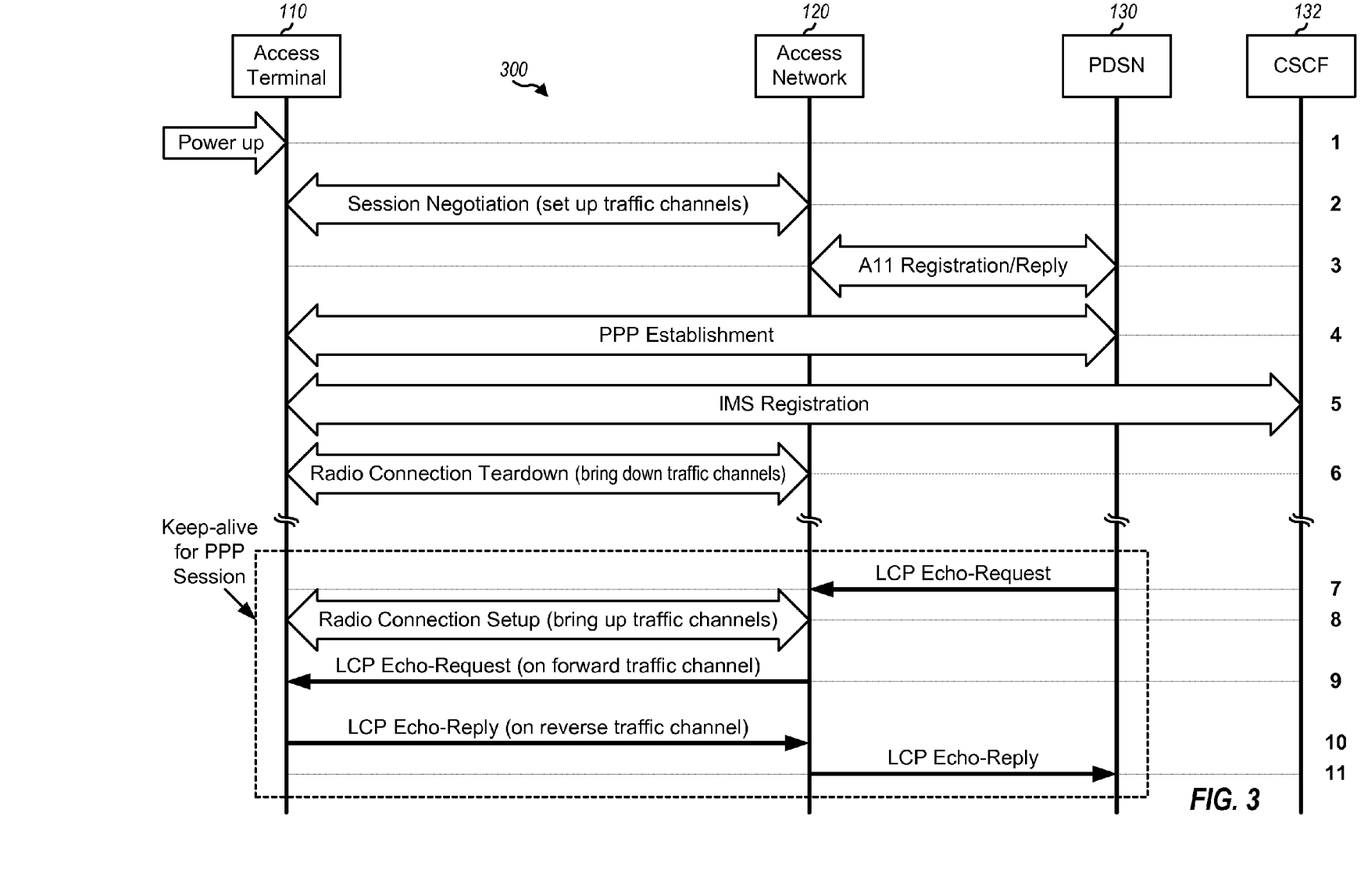
FIG. 3 shows a call flow for maintaining a data session for an access terminal.

FIG. 3 shows a call flow 300 for maintaining always-on IMS in wireless network 100. Access terminal 110 may receive a request to originate a packet data call, e.g., for IMS registration when access terminal 110 is powered up (step 1). Access terminal 110 may then perform session negotiation with access network 120 to set up a radio link, e.g., to set up traffic channels for the forward and reverse links (step 2). Terminal authentication may also be performed in step 2 to authenticate access terminal 110 to access network 120. Access network 120 may exchange A11 signaling with PDSN 130 to establish an A10 connection that will carry traffic data for access terminal 110 (step 3).

Access terminal 110 may then exchange signaling with PDSN 130 for PPP establishment (step 4). PPP establishment is composed of the following three phases:

1. Link establishment phase—establish, configure, and test a data-link connection between access terminal 110 and PDSN 130 using Link Control Protocol (LCP);
2. Authentication phase—authenticate a user of access terminal 110; and
3. Network layer protocol phase—configure a network layer protocol, e.g., IP version 4 (IPv4) or IP version 6 (IPv6), using IP Control Protocol (IPCP).

The three phases for PPP establishment are described in Request for Comments (RFC) 1661, entitled "The Point-to-Point Protocol (PPP)," which is publicly available.

After completing PPP establishment, access terminal 110 has a PPP session with PDSN 130. The PPP session may be opened for any duration of time until it is closed by either access terminal 110 or PDSN 130. Access terminal 110 may then exchange signaling with CSCF 132 for IMS registration (step 5). Access terminal 110 may thereafter exchange IP packets with CSCF 132 via PDSN 130 for IMS. After registering for IMS, access terminal 110 may keep the PPP session on at all times in order to remain reachable and may or may not be actively engaged in a data service. The radio connection for access terminal 110 may be brought down due to inactivity at access terminal 110 (step 6).

It may be desirable to maintain an always-on PPP session between access terminal 110 and PDSN 130 for several reasons. First, data may be sent by or to access terminal 110 more quickly without having to re-establish PPP. Setting up PPP from the beginning may be time consuming. Second, PPP establishment can only be initiated by access terminal 110 in HRPD, and wireless network 100 would not be able to initiate PPP establishment when there is incoming data for access terminal 110. Hence, always-on IMS for access terminal 110 may be supported with the always-on PPP session. For example, the always-on PPP session would allow wireless network 100 to send a SIP INVITE message to access terminal 110 to set up an incoming VoIP call. SIP is a signaling protocol for initiating, modifying, and terminating IP-based interactive user sessions such as VoIP.

Even though the PPP session may be always on, the data session for access terminal 110 may be considered dormant when there is no activity on traffic channels for the access terminal, e.g., no data transfer in either the forward or reverse direction. When the data session is dormant, the radio connection (e.g., the traffic channels) at the radio layer may be brought down in order to conserve radio resources, but the PPP layer and above may still be up for the reasons noted above. Whenever there is data to send by or to access terminal 110, the radio connection may be quickly brought up without having to re-establish PPP.

During the always-on PPP session, PDSN 130 may periodically "ping" access terminal 110 to determine whether the PPP session is still alive at the access terminal. If the PPP session has terminated silently at access terminal 110 for any reason (e.g., due to the access terminal being powered down by the user), then it may be desirable for PDSN 130 to close the PPP session and reclaim any dangling resources.

FIG. 3 shows a keep-alive functionality for the always-on PPP session using LCP Echo-Request and Echo-Reply packets, which are described in the aforementioned RFC 1661. PDSN 130 may send an LCP Echo-Request packet for access terminal 110 to access network 120 (step 7). Access network 120 may receive the LCP Echo-Request packet from PDSN 130 and may bring up a radio connection for access terminal 110 (step 8). Access network 120 may then send the LCP Echo-Request packet on a forward traffic channel to access terminal 110 (step 9). Access terminal 110 may receive the LCP Echo-Request packet and return an LCP Echo-Reply packet on a reverse traffic channel to access network 120 (step 10). Access network 120 may receive the LCP Echo-Reply packet and forward it to PDSN 130 (step 11). Upon receiving the LCP Echo-Reply packet, PDSN 130 may recognize that the PPP session is still up at access terminal 110.

The LCP Echo-Request and Echo-Reply packets may be exchanged periodically during the always-on PPP session. PDSN 130 may maintain a timer, which may be set to a suitable value. PDSN 130 may initiate the LCP Echo-Request and Echo-Reply packet exchange when the timer expires.

The keep-alive functionality may be useful for ensuring that the PPP session is still up at access terminal 110. However, a radio connection may be brought up just to exchange the LCP Echo-Request and Echo-Reply packets, and no other useful data may be exchanged via the radio connection. Bringing up the radio connection just to exchange LCP Echo-Request and Echo-Reply packets for the keep-alive functionality may waste radio resources.

In an aspect, the LCP Echo-Request and Echo-Reply packets may be sent using non-traffic channels that may always be available. This would then avoid the need to set up a radio connection and bring up traffic channels just to send these packets. In general, a traffic channel may be a channel used to send traffic/user data, and a non-traffic channel may be any channel that is not a traffic channel. Different non-traffic channels may be available in different wireless networks. Furthermore, different non-traffic channels may be available for the forward and reverse links.

Table 1 lists some traffic and non-traffic channels in HRPD. Access terminal 110 may be assigned a forward traffic channel and a reverse traffic channel when a radio connection is opened and may exchange data using these traffic channels. Access terminal 110 may be assigned no traffic channels when the radio connection is closed and may exchange data with access network 120 using a control channel and an access channel.

TABLE 1

| Channel | Link | Description |
| --- | --- | --- |
| Traffic Channel | Each Link | May be brought up when and as needed to carry traffic data and brought down when not needed to conserve radio resources. |
| Control Channel | Forward Link | Always available on the forward link to send signaling and small amount of data. |
| Access Channel | Reverse Link | Always available on the reverse link to send signaling and small amount of data. |

The control channel and access channel are low data rate channels that are available at all times on the forward and reverse links, respectively. The control channel and access channel may be used to send low volume and small packet sized data in order to avoid bringing up traffic channels to send the data. Data may be sent on the control channel and access channel in accordance with a Data Over Signaling (DOS) protocol defined in 3GPP2 C.S0024-A, entitled "cdma2000 High Rate Packet Data Air Interface Specification," June 2006, which is publicly available.

The control channel may be shared by all access terminals on the forward link. Access terminal 110 may be assigned specific time slots in which it might receive signaling and/or data on the control channel. Access terminal 110 may process the control channel during the assigned time slots in order to recover any signaling and/or data sent to the access terminal.

The access channel may be shared by all access terminals on the reverse link. Access terminal 110 may send access channel capsules on the access channel whenever there is data to send. Access terminal 110 may send the access channel capsules in accordance with an access procedure defined in C.S0024-A.

Figure 4:
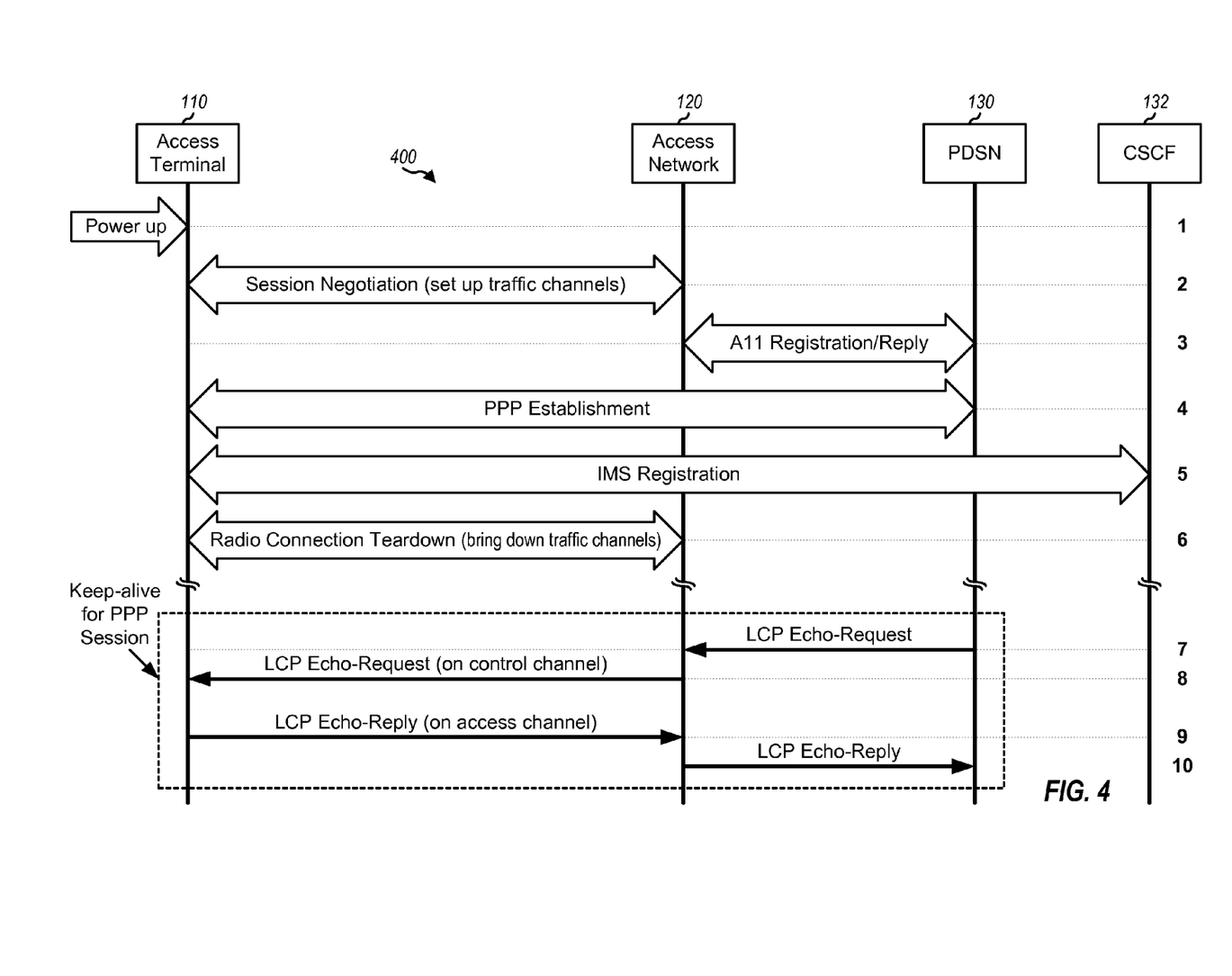
FIG. 4 shows a call flow for maintaining the data session using non-traffic channels for keep-alive functionality.

FIG. 4 shows a design of a call flow 400 for maintaining always-on IMS using non-traffic channels for the keep-alive functionality for an always-on PPP session. Access terminal 110 may establish a PPP session and register for IMS in steps 1 through 6, as described above for FIG. 3.

For the keep-alive functionality, PDSN 130 may send an LCP Echo-Request packet for access terminal 110 to access network 120 (step 7). Access network 120 may receive the LCP Echo-Request packet and send this packet using mobile-terminated DOS on the control channel to access terminal 110, without setting up a radio connection (step 8). Access terminal 110 may receive the LCP Echo-Request packet and return an LCP Echo-Reply packet using mobile-originated DOS on the access channel to access network 120 (step 9). Access network 120 may receive the LCP Echo-Reply packet and forward it to PDSN 130 (step 10). As shown in FIG. 4, radio connection setup may be avoided by sending the LCP Echo-Request and Echo-Reply packets on the control channel and access channel, respectively, using DOS in HRPD.

Access terminal 110 may be dormant and may move about while dormant. Access network 120 may not know the current location of access terminal 110. Access network 120 may then send a DOS message containing the LCP Echo-Request packet over a wide area in order to ensure that access terminal 110 can receive this packet. However, sending the DOS message over a wide area may consume more network resources and reduce network capacity.

Figure 5:
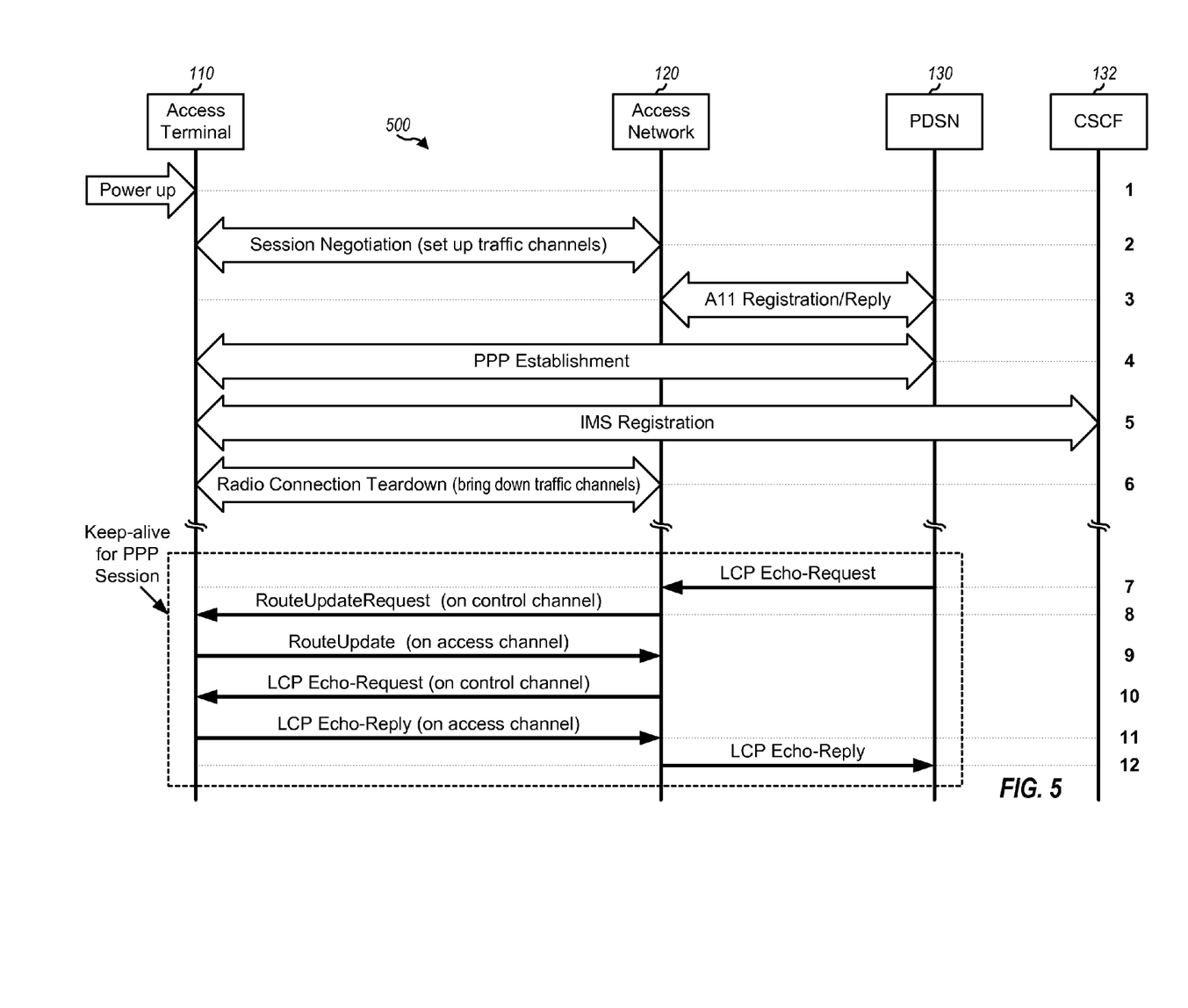
FIG. 5 shows a call flow for maintaining the data session using non-traffic channels and approximate location discovery for keep-alive functionality.

In another aspect, an approximate location of access terminal 110 may first be ascertained whenever an LCP Echo-Request packet is to be sent for the keep-alive functionality. Access network 120 may then send the LCP Echo-Request packet over a smaller area covering the approximate location of access terminal 110.

FIG. 5 shows a design of a call flow 500 for maintaining always-on IMS using non-traffic channels and approximate location discovery for the keep-alive functionality for an always-on PPP session. Access terminal 110 may establish a PPP session and register for IMS in steps 1 through 6, as described above for FIG. 3.

For the keep-alive functionality, PDSN 130 may send an LCP Echo-Request packet for access terminal 110 to access network 120 (step 7). Access network 120 may receive the LCP Echo-Request packet and determine the approximate location of access terminal 110 by sending a RouteUpdateRequest message for access terminal 110 on the control channel over a wide area (step 8). The RouteUpdateRequest message does not have any data payload and thus consumes much less radio resources than a DOS message with a payload for the LCP Echo-Request packet. Access terminal 110 may receive the RouteUpdateRequest message and return a RouteUpdate message on the access channel to access network 120 (step 9). The RouteUpdate message may include pilot information for sectors in an active set and a candidate set for access terminal 110. The approximate location of access terminal 110 may be ascertained based on the sector that receives the RouteUpdate message and/or the pilot information in the message.

Access network 120 may then send the LCP Echo-Request packet using mobile-terminated DOS on the control channel over a smaller area to access terminal 110, without setting up a radio connection (step 10). Access terminal 110 may receive the LCP Echo-Request packet and return an LCP Echo-Reply packet using mobile-originated DOS on the access channel to access network 120 (step 11). Access network 120 may receive the LCP Echo-Reply packet and forward it to PDSN 130 (step 12).

As shown in FIG. 5, radio connection setup may be avoided by (a) sending the RouteUpdateRequest message and the LCP Echo-Request packet on the control channel to access terminal 110 and (b) sending the RouteUpdate message and the LCP Echo-Reply packet on the access channel to access network 120. Even though two messages are sent on the forward link, these messages may be sent using less radio resources because (a) the RouteUpdateRequest message may be much smaller and may thus be sent using much less radio resources than a DOS message with the LCP Echo-Request packet and (b) the DOS message may be sent over a smaller area.

Access network 120 may also attempt to determine the approximate location of access terminal 110 by paging the access terminal instead of sending a RouteUpdateRequest message. The page may direct access terminal 110 to respond to the page via the access channel, instead of bringing up a radio connection as is normally done.

As shown in FIGS. 4 and 5, PDSN 130 may initiate the keep-alive functionality by sending an LCP Echo-Request packet to access network 120. PDSN 130 may exchange data with PCF 124 in access network 120 using Generic Routing Encapsulation (GRE) protocol. Link layer/network layer data may be encapsulated in GRE packets, which may be exchanged between PDSN 130 and PCF 124. A GRE packet includes an SDI/DoS field that may be set to 1 to indicate that the data carried in the GRE packet can be sent using DOS. PDSN 130 may set this field for a GRE packet carrying an LCP Echo-Request packet. Access network 120 may examine this field in the GRE packet and may send the LCP Echo-Request packet using DOS when the field is set. GRE and data exchanges between PDSN 130 and access network 120 are described in 3GPP2 A.S0008-B and A.S0009-B, both entitled "Interoperability Specification (IOS) for High Rate Packet Data (HRPD) Radio Access Network Interfaces with Session Control in the Access Network," dated October 2006, and publicly available.

For clarity, the techniques for maintaining an always-on data session have been specifically described for HRPD. The techniques may also be used for other wireless networks and other radio technologies such as, e.g., IS-2000 Releases 0 and A (which are commonly referred to as CDMA2000 1×, or simply, 1×), IS-95, W-CDMA, GSM, etc. 1× supports transmission of Short Data Burst in a Data Burst Message on a paging channel (PCH), a forward common control channel (F-CCCH), a reverse access channel (R-ACH), a reverse enhanced access channel (R-EACH), etc. The Short Data Burst may be used to send small amount of data in similar manner as the DOS message in HRPD.

Figure 6:
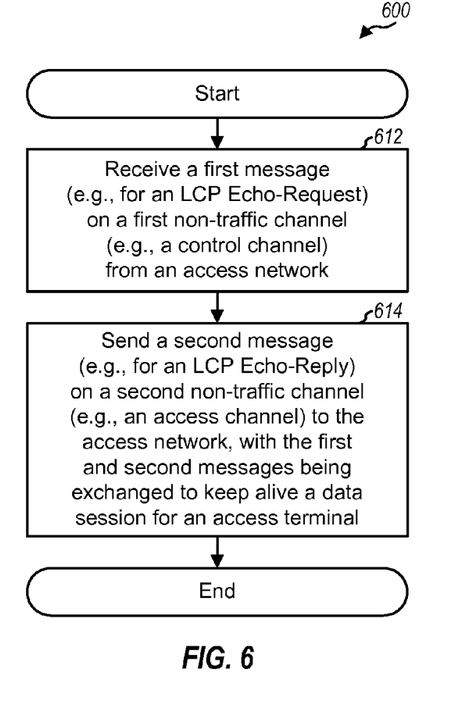
FIGS. 6 and 7 show processes performed by the access terminal and an access network, respectively, to keep alive the data session for the access terminal.

FIG. 6 shows a design of a process 600 for exchanging messages to keep alive a data session for an access terminal. Process 600 may be performed by the access terminal. A first message may be received on a first non-traffic channel (e.g., a control channel or some other channel) from an access network (block 612). A second message may be sent on a second non-traffic channel (e.g., an access channel or some other channel) to the access network (block 614). The first and second messages may be exchanged to keep alive the data session for the access terminal. The access terminal may avoid setting up a radio connection and bringing up traffic channels to exchange the first and second messages with the access network.

The data session may comprise a PPP session and/or some other session. The first message may comprise an LCP Echo-Request packet or some other packet to ping the access terminal for the data session. The second message may comprise an LCP Echo-Reply packet or some other packet to reply to the ping. For HRPD, the first message may be sent by the access network using mobile-terminated DOS, and the second message may be sent by the access terminal using mobile-originated DOS. The first and second messages may also be sent in other manners (e.g., using Short Data Burst) for other radio technologies.

Figure 7:
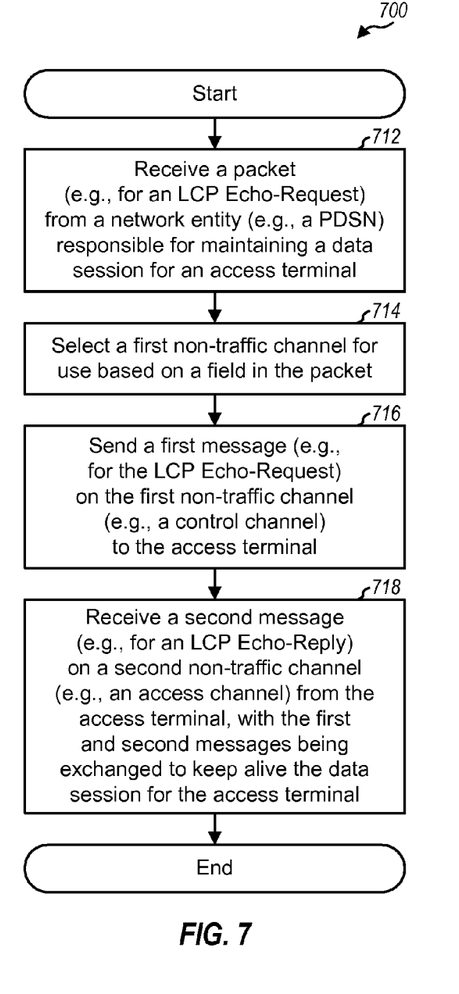

FIG. 7 shows a design of a process 700 for exchanging messages to keep alive a data session for an access terminal. Process 700 may be performed by an access network. A packet may be received from a network entity (e.g., a PDSN) responsible for maintaining the data session for the access terminal (block 712). A first non-traffic channel may be selected for use based on a field in the packet (block 714).

A first message may be sent on the first non-traffic channel (e.g., a control channel) to the access terminal (block 716). A second message may be received on a second non-traffic channel (e.g., an access channel) from the access terminal (block 718). The first and second messages may be exchanged to keep alive the data session for the access terminal. The first message may comprise an LCP Echo-Request packet and may be sent by the access network using mobile-terminated DOS in HRPD. The second message may comprise an LCP Echo-Reply packet and may be sent by the access terminal using mobile-originated DOS in HRPD.

Figure 8:
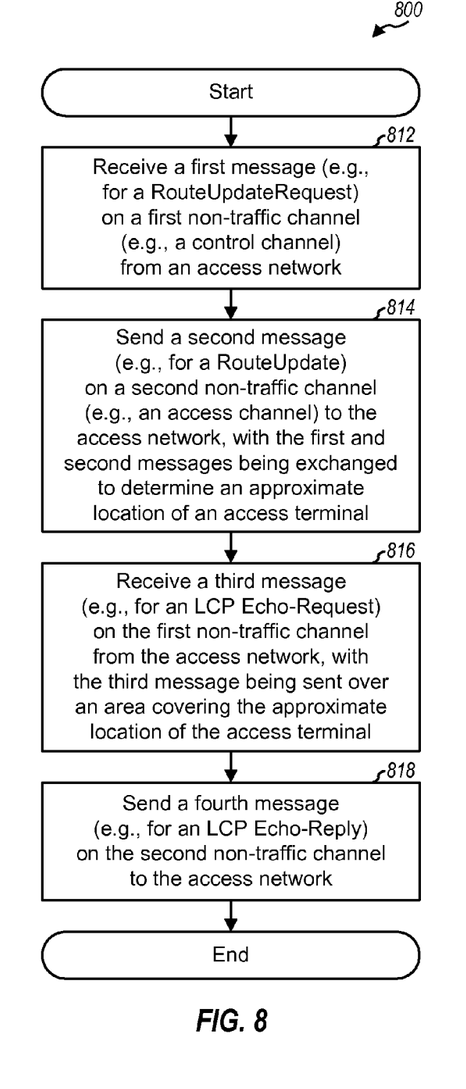
FIGS. 8 and 9 show processes performed by the access terminal and the access network, respectively, to send signaling using approximate location discovery.

FIG. 8 shows a design of a process 800 for receiving signaling by an access terminal. A first message may be received on a first non-traffic channel (e.g., a control channel or some other channel) from an access network (block 812). A second message may be sent on a second non-traffic channel (e.g., an access channel or some other channel) to the access network (block 814). The first and second messages may be exchanged to determine an approximate location of the access terminal. The first message may comprise a RouteUpdateRequest message or some other message to query the access terminal. The second message may comprise a RouteUpdate message or some other message to respond to the query. A third message may be received on the first non-traffic channel from the access network, with the third message being sent over an area covering the approximate location of the access terminal (block 816). In general, the third message may carry any information for the access terminal.

If signaling is being exchanged to keep alive a data session for the access terminal, then a fourth message may be sent on the second non-traffic channel to the access network (block 818). The third message may comprise an LCP Echo-Request packet or some other message to ping the access terminal. The fourth message may comprise an LCP Echo-Reply packet or some other message containing a reply to the ping. The messages may be sent using DOS, Short Data Burst, etc. The access terminal may avoid setting up a radio connection and bringing up traffic channels to exchange the messages with the access network.

Figure 9:
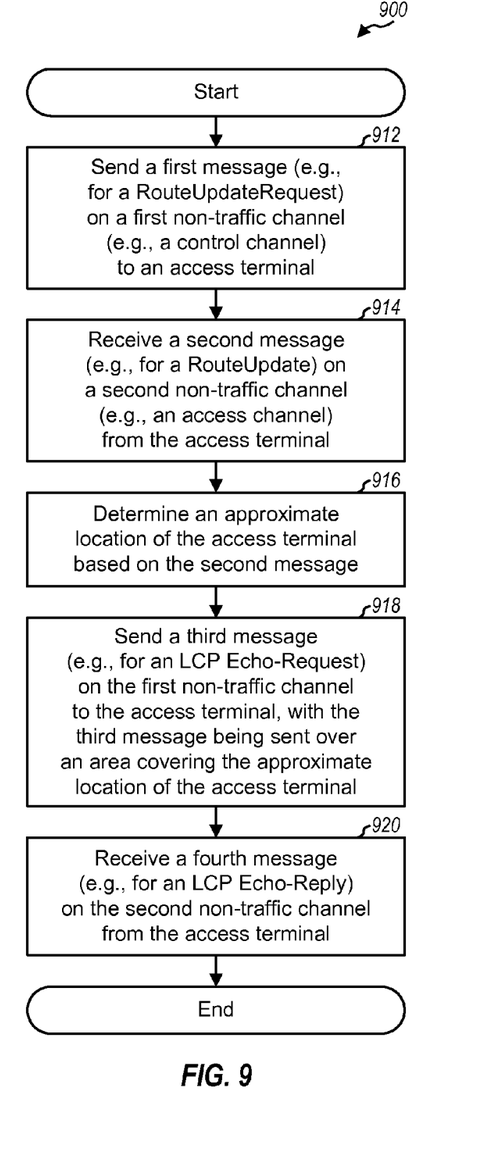

FIG. 9 shows a design of a process 900 for sending signaling to an access terminal. Process 900 may be performed by an access network. A first message may be sent on a first non-traffic channel (e.g., a control channel) to the access terminal (block 912). A second message may be received on a second non-traffic channel (e.g., an access channel) from the access terminal (block 914). The first message may comprise a RouteUpdateRequest message, and the second message may comprise a RouteUpdate message. An approximate location of the access terminal may be determined based on the second message (block 916).

A third message may be sent on the first non-traffic channel to the access terminal, with the third message being sent over an area covering the approximate location of the access terminal (block 918). The first message may be sent over a first area, and the second message may be sent over a second area that is smaller than the first area. The first message may be sent in response to determining that (a) a radio connection for the access terminal is down and (b) the third message can be sent on the first non-traffic channel. In general, the third message may carry any information for the access terminal. If signaling is being exchanged to keep alive a data session for the access terminal, then a fourth message may be received on the second non-traffic channel from the access terminal (block 920).

Figure 10:
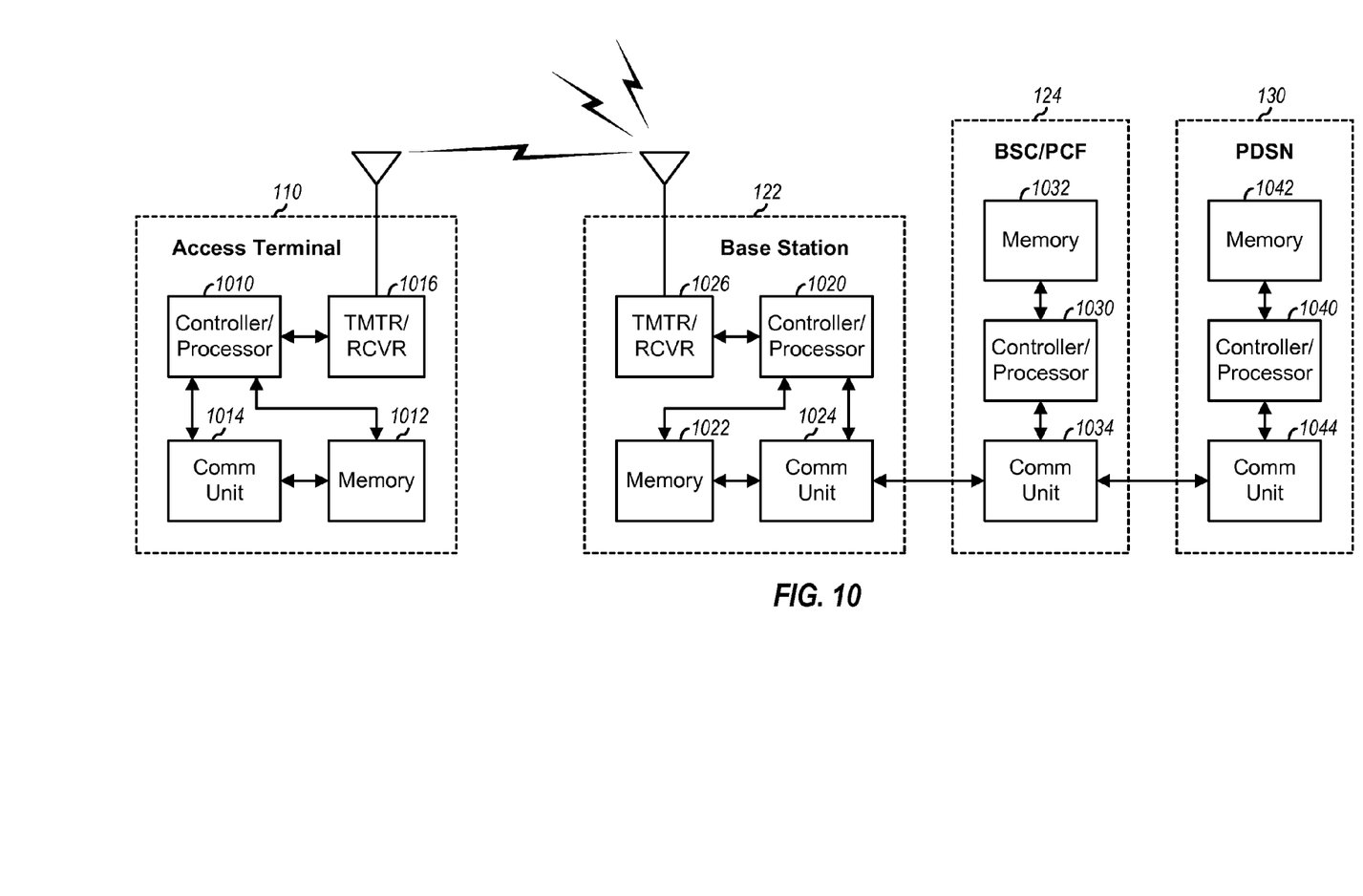
FIG. 10 shows a block diagram of the access terminal and network entities.

FIG. 10 shows a block diagram of a design of access terminal 110, base station 122, BSC/PCF 124, and PDSN 130 in FIG. 1. On the reverse link, at access terminal 110, a controller/processor 1010 may process (e.g., format, encode, and modulate) data and signaling to be sent to access network 120 in accordance with a radio technology (e.g., HRPD) and generate output chips. A transmitter (TMTR) 1016 may condition (e.g., convert to analog, filter, amplify, and frequency upconvert) the output chips and generate a reverse link signal, which may be transmitted to base station 122. At base station 122, the reverse link signals from access terminal 110 and other access terminals may be received and conditioned (e.g., filtered, amplified, frequency downconverted, and digitized) by a receiver (RCVR) 1026 to obtain samples. A controller/processor 1020 may process (e.g., demodulate and decode) the samples to obtain the data and signaling sent by access terminal 110 and other access terminals.

On the forward link, at base station 122, data and signaling to be sent to access terminals may be processed by processor 1020 and further conditioned by transmitter 1026 to generate a forward link signal, which may be transmitted to the access terminals. At access terminal 110, the forward link signal from base station 122 may be received and conditioned by receiver 1016 and further processed by processor 1010 to obtain data and signaling sent by base station 122 to access terminal 110.

Controllers/processors 1010 and 1020 may control the operation at access terminal 110 and base station 122, respectively. Processor 1010 may implement process 600 in FIG. 6, process 800 in FIG. 8, and/or other processes to exchange signaling. Memories 1012 and 1022 may store program codes and data for access terminal 110 and base station 122, respectively. A communication (Comm) unit 1024 may allow base station 122 to communicate with BSC/PCF 124.

BSC/PCF 124 includes a controller/processor 1030, a memory 1032, and a communication unit 1034. PDSN 130 includes a controller/processor 1040, a memory 1042, and a communication unit 1044. For each network entity, the controller/processor may perform pertinent processing for that network entity, the memory may store program codes and data, and the communication unit may support communication with other network entities. Processor 1020 at base station 122 and/or processor 1030 at BSC/PCF 124 may perform process 700 in FIG. 7, process 900 in FIG. 9, and/or other processes to exchange signaling with the access terminals.

FIG. 10 shows a simplified block diagram of access terminal 110 and other network entities. In general, access terminal 110 and the network entities may each include any number of processors, controllers, memories, communication units, transmitters, receivers, etc.

The techniques described herein may be implemented by various means. For example, these techniques may be implemented in hardware, firmware, software, or a combination thereof. For a hardware implementation, the processing units used to perform the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software instructions may be stored in a memory (e.g., memory 1012, 1022, 1032 or 1042 in FIG. 10) and executed by a processor (e.g., processor 1010, 1020, 1030 or 1040). The memory may be implemented within the processor or external to the processor. The firmware and/or software instructions may also be stored in other processor-readable medium such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An access terminal for wireless communication in a wireless network, comprising:
    at least one processor configured to direct the access terminal to:
        receive a first message, at the access terminal, on a first non-traffic channel from an access network while a radio connection of the access terminal is closed and no traffic channels are assigned to the access terminal, wherein the first message is received by the access terminal in a first area of the wireless network,
        send a second message on a second non-traffic channel to the access network while the radio connection is closed and no traffic channels are assigned to the access terminal, wherein the first and second messages are configured to allow the access network to determine a second area of the wireless network that is smaller than the first area based on an approximate location of the access terminal,
        receive a third message, at the access terminal, on the first non-traffic channel from the access network while the radio connection is closed and no traffic channels are assigned to the access terminal, wherein the third message is received by the access terminal in the second area of the wireless network,
        send a fourth message on the second non-traffic channel to the access network, wherein the third message and the fourth messages are configured to keep alive a data session of the access terminal, wherein the first non-traffic channel and the second non-traffic channel are different channels; and
    a memory coupled to the at least one processor.

2. The access terminal of claim 1, wherein the at least one processor is further configured to avoid setting up the radio connection and bringing up the traffic channels to exchange the first, second, third, and fourth messages with the access network.

3. The access terminal of claim 1, wherein the first non-traffic channel is a control channel and the second non-traffic channel is an access channel.

4. The access terminal of claim 1, wherein the data session comprises a Point-to-Point Protocol (PPP) session.

5. The access terminal of claim 1, wherein the third message comprises a ping for the data session and the fourth message comprises a reply to the ping.

6. The access terminal of claim 1, wherein the third message comprises a Link Control Protocol (LCP) Echo-Request packet, and the fourth message comprises an LCP Echo-Reply packet.

7. The access terminal of claim 1, wherein the at least one processor is further configured to receive the third message using mobile-terminated Data Over Signaling (DOS) in High Rate Packet Data (HRPD), and to send the fourth message using mobile-originated DOS in HRPD.

8. A method of wireless communication in a wireless network, comprising:
    receiving a first message, at an access terminal, on a first non-traffic channel from an access network while a radio connection of the access terminal is closed and no traffic channels are assigned to the access terminal, wherein the first message is received by the access terminal in a first area of the wireless network;
    sending a second message on a second non-traffic channel to the access network, while the radio connection is closed and no traffic channels are assigned to the access terminal, wherein the first and second messages are configured to allow the access network to determine a second area of the wireless network that is smaller than the first area based on an approximate location of the access terminal;
    receiving a third message, at the access terminal, on the first non-traffic channel from the access network while the radio connection is closed and no traffic channels are assigned to the access terminal, wherein the third message is received by the access terminal in the second area of the wireless network; and
    sending a fourth message on the second non-traffic channel to the access network, wherein the third and fourth messages are configured to keep alive a data session for the access terminal, and the first non-traffic channel and the second non-traffic channel are different channels.

9. The method of claim 8, wherein the first non-traffic channel is a control channel for a forward link, and the second non-traffic channel is an access channel for a reverse link.

10. The method of claim 8, wherein the third message comprises a ping for the data session and the fourth message comprises a reply to the ping.

11. An access terminal for wireless communication in a wireless network, comprising:
    means for receiving, at the access terminal, a first message on a first non-traffic channel from an access network while a radio connection of the access terminal is closed and no traffic channels are assigned to the apparatus, wherein the first message is received by the access terminal in a first area of the wireless network;
    means for sending a second message on a second non-traffic channel to the access network while the radio connection is closed and no traffic channels are assigned to the access terminal, wherein the first and second messages are configured to allow the access network to determine a second area of the wireless network that is smaller than the first area based on an approximate location of the access terminal;

means for receiving a third message, at the access terminal, on the first non-traffic channel from the access network while the radio connection is closed and no traffic channels are assigned to the access terminal, wherein the third message is received by the access terminal in the second area of the wireless network; and means for sending a fourth message on the second non-traffic channel to the access network, wherein the third message and the fourth messages are configured to keep alive a data session for the access terminal, and the first non-traffic channel and the second non-traffic channel are different channels.

12. The access terminal of claim 11, wherein the first non-traffic channel is a control channel for a forward link, and the second non-traffic channel is an access channel for a reverse link.

13. The access terminal of claim 11, wherein the third message comprises a ping for the data session and the fourth message comprises a reply to the ping.

14. A computer product, comprising:
a non-transitory computer-readable medium including instructions configured to cause a processor of an access terminal to direct the access terminal to:
receive a first message, at the access terminal, on a first non-traffic channel from an access network while a radio connection of the access terminal is closed and no traffic channels are assigned to the access terminal, wherein the first message is received by the access terminal in a first area of a wireless network; and
send a second message on a second non-traffic channel to the access network while the radio connection is closed and no traffic channels are assigned to the access terminal, wherein the first and second messages are configured to allow the access network to determine a second area of the wireless network that is smaller than the first area based on an approximate location of the access terminal;
receive a third message, at the access terminal, on the first non-traffic channel from the access network while the radio connection is closed and no traffic channels are assigned to the access terminal, wherein the third message is received by the access terminal in the second area of the wireless network,
send a fourth message on the second non-traffic channel to the access network, wherein the third message and the fourth messages are configured to keep alive a data session for the access terminal, and the first non-traffic channel and the second non-traffic channel are different channels.

15. An access network for wireless communication in a wireless network, comprising:
at least one processor configured to direct the access network to:
send a first message on a first non-traffic channel to an access terminal while a radio connection of the access terminal is closed and no traffic channels are assigned to the access terminal, wherein the first message is sent by the access network over a first area of the wireless network
receive a second message on a second non-traffic channel from the access terminal while the radio connection is closed and no traffic channels are assigned to the access terminal;
determine an approximate location of the access terminal in response to the first and second messages;
send a third message to the access terminal on the first non-traffic channel while the radio connection is closed and no traffic channels are assigned to the access terminal, wherein the third message is sent by the access terminal over a second area of the wireless network that is smaller than the first area based on the approximate location of the access terminal; and
receive a fourth message on the second non-traffic channel from the access terminal, wherein the third message and the fourth messages are configured to keep alive a data session for the access terminal, and the first non-traffic channel and the second non-traffic channel are different channels; and
a memory coupled to the at least one processor.

16. The access network of claim 15, wherein the first non-traffic channel is a control channel and the second non-traffic channel is an access channel.

17. The access network of claim 15, wherein the third message comprises a Link Control Protocol (LCP) Echo-Request packet, and the fourth message comprises an LCP Echo-Reply packet.

18. The access network of claim 15, wherein the at least one processor is further configured to direct the access network to send the third message using mobile-terminated Data Over Signaling (DOS) in High Rate Packet Data (HRPD), and to receive the fourth message sent by the access terminal using mobile-originated DOS in HRPD.

19. The access network of claim 15, wherein the at least one processor is further configured to receive a packet, carrying data for the third message, from a network entity responsible for maintaining the data session, and to select the first non-traffic channel for the first and third messages, wherein the selecting is based on a field in the packet.

20. The method of claim 8, wherein the method further comprises:
avoiding setting up the radio connection; and
avoiding bringing up the traffic channels to exchange the first, second, third, and fourth messages with the access network.

21. The method of claim 8, wherein the data session comprises a Point-to-Point Protocol (PPP) session.

22. The method of claim 8, wherein the third message comprises a Link Control Protocol (LCP) Echo-Request packet, and the fourth message comprises an LCP Echo-Reply packet.

23. The method of claim 8, wherein the method further comprises:
receiving the third message using mobile-terminated Data Over Signaling (DOS) in High Rate Packet Data (HRPD); and
sending the fourth message using mobile-originated DOS in HRPD.

24. The access terminal of claim 11, wherein the access terminal further comprises:
means for avoiding setting up the radio connection; and
means for avoiding bringing up the traffic channels to exchange the first, second, third, and fourth messages with the access network.

25. The access terminal of claim 11, wherein the data session comprises a Point-to-Point Protocol (PPP) session.

26. The access terminal of claim 11, wherein the third message comprises a Link Control Protocol (LCP) Echo-Request packet, and the fourth message comprises an LCP Echo-Reply packet.

27. The access terminal of claim 11, wherein the access terminal further comprises:
  means for receiving the third message using mobile-terminated Data Over Signaling (DOS) in High Rate Packet Data (HRPD); and
  means for sending the fourth message using mobile-originated DOS in HRPD.

28. The computer product of claim 14, wherein the first non-traffic channel is a control channel for a forward link, and the second non-traffic channel is an access channel for a reverse link.

29. The computer product of claim 14, wherein the third message comprises a ping for the data session and the fourth message comprises a reply to the ping.

30. The computer product of claim 14, wherein the non-transitory computer-readable medium further comprises instructions configured to cause the processor to:
  avoid setting up radio connection; and
  avoid bringing up the traffic channels to exchange the first, second, third, and fourth messages with the access network.

31. The computer product of claim 14, wherein the data session comprises a Point-to-Point Protocol (PPP) session.

32. The computer product of claim 14, wherein the third message comprises a Link Control Protocol (LCP) Echo-Request packet, and the fourth message comprises an LCP Echo-Reply packet.

33. The computer product of claim 14, wherein the non-transitory computer-readable medium further comprises instructions configured to cause the processor to direct the access terminal to:
  receive the third message using mobile-terminated Data Over Signaling (DOS) in High Rate Packet Data (HRPD); and
  send the fourth message using mobile-originated DOS in HRPD.

34. A method of wireless communication in a wireless network, comprising:
  sending a first message on a first non-traffic channel to an access terminal while a radio connection of the access terminal is closed and no traffic channels are assigned to the access terminal, wherein the first message is sent by the access network over a first area of the wireless network;
  receiving a second message on a second non-traffic channel from the access terminal, while the radio connection is closed and no traffic channels are assigned to the access terminal;
  determining an approximate location of the access terminal in response to the first and second messages;
  sending a third message to the access terminal on the first non-traffic channel while the radio connection is closed and no traffic channels are assigned to the access terminal, wherein the third message is sent by the access terminal over a second area of the wireless network that is smaller than the first area based on the approximate location of the access terminal; and
  receiving a fourth message on the second non-traffic channel from the access terminal, wherein the third message and the fourth message are configured to keep alive a data session for the access terminal, and the first non-traffic channel and the second non-traffic channel are different channels.

35. The method of claim 34, wherein the method further comprises:
  sending the third message on a control channel to the access terminal; and
  receiving the fourth message on an access channel from the access terminal.

36. The method of claim 34, wherein the third message comprises a Link Control Protocol (LCP) Echo-Request packet, and the fourth message comprises an LCP Echo-Reply packet.

37. The method of claim 34, wherein the method further comprises:
  sending the third message using mobile-terminated Data Over Signaling (DOS) in High Rate Packet Data (HRPD); and
  receiving the fourth message sent by the access terminal using mobile-originated DOS in HRPD.

38. The method of claim 34, wherein the method further comprises:
  receiving a packet, carrying data for the third message, from a network entity responsible for maintaining the data session; and
  selecting the first non-traffic channel for the first and third messages, wherein the selecting is based on a field in the packet.

39. An access network for wireless communication in a wireless network, comprising:
  means for sending a first message on a first non-traffic channel to an access terminal while a radio connection of the access terminal is closed and no traffic channels are assigned to the access terminal, wherein the first message is sent by the access network over a first area of the wireless network; and
  means for receiving a second message on a second non-traffic channel from the access terminal, while the radio connection is closed and no traffic channels are assigned to the access terminal;
  means for determining an approximate location of the access terminal in response to the first and second messages;
  means for sending a third message to the access terminal on the first non-traffic channel while the radio connection is closed and no traffic channels are assigned to the access terminal, wherein the third message is sent by the access terminal over a second area of the wireless network that is smaller than the first area based on the approximate location of the access terminal; and
  means for receiving a fourth message on the second non-traffic channel from the access terminal, wherein the third message and the fourth messages are configured to keep alive a data session for the access terminal, and the first non-traffic channel and the second non-traffic channel are different channels.

40. The access network of claim 39, wherein the access network further comprises:
  means for sending the third message on a control channel to the access terminal; and
  means for receiving the fourth message on an access channel from the access terminal.

41. The access network of claim 39, wherein the third message comprises a Link Control Protocol (LCP) Echo-Request packet, and the fourth message comprises an LCP Echo-Reply packet.

42. The access network of claim 39, wherein the access network further comprises:
  means for sending the third message using mobile-terminated Data Over Signaling (DOS) in High Rate Packet Data (HRPD); and
  means for receiving the fourth message sent by the access terminal using mobile-originated DOS in HRPD.

43. The method of access network of claim 39, wherein the access network further comprises:
  means for receiving a packet, carrying data for the third message, from a network entity responsible for maintaining the data session; and
  means for selecting the first non-traffic channel for the first and third messages, wherein the selecting is based on a field in the packet.

44. A computer product, comprising:
  a non-transitory computer-readable medium including instructions configured to cause a processor to direct an access network to:
  send a first message on a first non-traffic channel to an access terminal while a radio connection of the access terminal is closed and no traffic channels are assigned to the access terminal, wherein the first message is sent by the access network over a first area of a wireless network;
  receive a second message on a second non-traffic channel from the access terminal, while the radio connection is closed and no traffic channels are assigned to the access terminal;
  determine an approximate location of the access terminal in response to the first and second messages;
  send a third message to the access terminal on the first non-traffic channel while the radio connection is closed and no traffic channels are assigned to the access terminal, wherein the third message is sent by the access terminal over a second area of the wireless network that is smaller than the first area based on the approximate location of the access terminal; and
  receive a fourth message on the second non-traffic channel from the access terminal, wherein the third message and the fourth message are configured to keep alive a data session for the access terminal, and the first non-traffic channel and the second non-traffic channel are different channels.

45. The computer product of claim 44, wherein the non-transitory computer-readable medium further comprises instructions configured to cause the processor to direct the access network to:
  send the third message on a control channel to the access terminal; and
  receive the fourth message on an access channel from the access terminal.

46. The computer product of claim 44, wherein the third message comprises a Link Control Protocol (LCP) Echo-Request packet, and the fourth message comprises an LCP Echo-Reply packet.

47. The computer product of claim 44, wherein the non-transitory computer-readable medium further comprises instructions configured to cause the processor to direct the access network to:
  send the third message using mobile-terminated Data Over Signaling (DOS) in High Rate Packet Data (HRPD); and
  receive the fourth message sent by the access terminal using mobile-originated DOS in HRPD.

48. The computer product of claim 44, wherein the non-transitory computer-readable medium further comprises instructions configured to cause the processor to:
  receive a packet, carrying data for the third message, from a network entity responsible for maintaining the data session; and
  select the first non-traffic channel for the first and third messages, wherein the selecting is based on a field in the packet.

49. The access network of claim 15, wherein the first message comprises a RouteUpdateRequest message and the second message comprises a RouteUpdate message.

50. The access network of claim 49, wherein the RouteUpdate message comprises pilot information for sectors in an active set and a candidate set for the access terminal, and wherein determining the approximate location of the access terminal is based on the pilot information included in the RouteUpdate message.

51. The access network of claim 49, wherein determining the approximate location of the access terminal is based on which sector of the wireless network receives the RouteUpdate message.

52. The method of claim 34, wherein the first message comprises a RouteUpdateRequest message and the second message comprises a RouteUpdate message.

53. The method of claim 52, wherein the RouteUpdate message comprises pilot information for sectors in an active set and a candidate set for the access terminal, and wherein determining the approximate location of the access terminal is based on the pilot information included in the RouteUpdate message.

54. The method of claim 52, wherein determining the approximate location of the access terminal is based on which sector of the wireless network receives the RouteUpdate message.

55. The access network of claim 39, wherein the first message comprises a RouteUpdateRequest message and the second message comprises a RouteUpdate message.

56. The access network of claim 55, wherein the RouteUpdate message comprises pilot information for sectors in an active set and a candidate set for the access terminal, and wherein determining the approximate location of the access terminal is based on the pilot information included in the RouteUpdate message.

57. The access network of claim 55, wherein determining the approximate location of the access terminal is based on which sector of the wireless network receives the RouteUpdate message.

58. The computer product of claim 44, wherein the first message comprises a RouteUpdateRequest message and the second message comprises a RouteUpdate message.

59. The computer product of claim 58, wherein the RouteUpdate message comprises pilot information for sectors in an active set and a candidate set for the access terminal, and wherein determining the approximate location of the access terminal is based on the pilot information included in the RouteUpdate message.

60. The computer product of claim 58, further comprising instructions configured to cause the processor to direct the access network to determine the approximate location of the access terminal based on which sector of the wireless network receives the RouteUpdate message.

* * * * *